United States Patent [19]

Emberson

[11] 4,099,274
[45] Jul. 11, 1978

[54] THERMOPLASTIC ARTICLE HAVING ACCESSIBLE WALL CAVITIES THEREIN FOR RECEPTION AND RETENTION OF SECURING MEANS

[76] Inventor: John Ernest Emberson, 25 Dogwood Cres., Scarborough, Ontario, Canada, M1P 3N5

[21] Appl. No.: 794,732

[22] Filed: May 9, 1977

[51] Int. Cl.² .......................... E03C 1/26; F16B 39/00
[52] U.S. Cl. ........................................... 4/286; 4/288; 4/292; 85/32 K; 138/89; 138/109; 151/41.7; 151/68; 339/125 R; 428/36
[58] Field of Search ................... 428/35, 36; 151/41.7, 151/41.76, 68; 52/698, 701, 507; 85/32 K; 339/125 R, 132 R; 15/176; 296/35 R, 35 A; 285/161, 414; 138/89, 96 R, 109; 4/286, 288, 292

[56] References Cited
U.S. PATENT DOCUMENTS

| 595,139 | 12/1897 | Blakely | 85/32 K |
|---|---|---|---|
| 2,665,730 | 1/1954 | Trumble | 151/41.7 |
| 3,178,749 | 4/1965 | Heepe | 151/68 |
| 3,180,660 | 4/1965 | Brewington | 151/41.7 |
| 3,279,518 | 10/1966 | Bollinger | 151/68 |
| 3,969,011 | 7/1976 | Yamada | 339/125 R |

Primary Examiner—William A. Powell
Assistant Examiner—M. G. Wityshyn
Attorney, Agent, or Firm—Hirons & Rogers

[57] ABSTRACT

A nut retaining formation is made in the wall of a thermoplastic (metal or plastic) article, such as the flange of a floor drain fitting, by a one step die forming operation. The formation has a cavity in the intermediate thickness of the flange, the height of the cavity being such that a screw threaded apertured nut is a close sliding fit therein. A runway formation provides access to the cavity from the top surface of the flange at one side thereof, the nut being slidable down the runway into the cavity. An aperture through the top surface provides access for a screw to be inserted into the cavity to engage a nut positioned therein. The top and bottom walls of the cavity are formed by discontinuous nut retaining formations in the top part and bottom part of the wall thickness, surrounding the screw receiving aperture. The formations in the top part of the wall thickness align vertically with gaps or separations between the nut retaining formations in the bottom part of the wall thickness, and the nut retaining formations in the bottom part of the wall thickness align vertically with gaps or separations between the nut retaining formations in the top part of the wall thickness. By this means, the formations and nut receiving cavity can be stamped in the wall by a one step pressing operation between a pair of co-operating dies, approaching from above and below the wall, and arranged to overlap one another in the pressing operation partially but not completely.

6 Claims, 6 Drawing Figures

THERMOPLASTIC ARTICLE HAVING ACCESSIBLE WALL CAVITIES THEREIN FOR RECEPTION AND RETENTION OF SECURING MEANS

FIELD OF THE INVENTION

This invention relates to thermoplastic articles of manufacture which are adapted to have securing means such as screw threaded nuts on clips embedded therein, to be releasably assembled with other structural items. More particularly, it relates to such articles provided with apertures through their wall thickness, with screw threaded securing means such as nuts in or below the apertures, to act as a securing means for securing other items to the articles of manufacture, in a releasable fashion.

BACKGROUND OF THE INVENTION

In the construction industry, it is commonly necessary to provide an article of manufacture which is to be partially embedded in a surface such as a floor, wall or roof, so that only one side of the article is subsequently accessible. When it is required to attach another item to such a partially embedded article, in a releasable manner, the exposed side of the article must be provided with accessible securing means, such as screw threaded apertures or the like. The provision of screw threaded apertures machined into the accessible surface of an article substantially increases its cost of manufacture. Whilst such an arrangement may be acceptable in relatively expensive articles made of strong materials such as metal, it is often impractical with articles made of synthetic plastics material, because screw threads machined into plastic articles are commonly not strong enough to permit rigid securing of other items to them.

A particular example of an article of manufacture to which the present invention relates is a floor drain, having a depending cylindrical body and an upper peripheral flange. Such fittings are normally installed by being embedded in concrete, which is poured up to the level of the flange, so that the top surface of the drain is substantially flush with the floor surface. Then, items such as drain covers, grilles or the like have to be releasably secured to the top surface of the drain. After pouring and hardening of the concrete, of course, there is no access to the bottom surface of the flange, to position securing means such as nuts below apertures provided therein. Recent advances in the construction and plumbing industries have made the use of synthetic thermoplastic materials such as ABS highly desirable for the manufacture of floor drain units. As noted above, however, the machining of screw threaded apertures from the top flange surface of a plastic floor drain unit, to permit releasable attachment of drain covers and the like thereto, should be avoided.

BRIEF DESCRIPTION OF THE PRIOR ART

It has previously been the practice, with plastic floor drains of the type described above, to provide plain apertures extending the entire way through the thickness of the flange, and a nut positioned below the flange under the aperture, for receiving screw attachment means of the drain cover. The nut is put into position before the concrete is poured. The nut may be located in a shallow recess in the under surface of the flange below the aperture, to provide for its initially correct positioning. Problems then arise, however, when it is necessary to remove the drain cover for any purpose, e.g. to replace the cover or to provide access to the drain for cleaning or maintenance purposes. If a void exists in the poured concrete in the vicinity of the nut, which commonly occurs, the nut will become displaced on removing the bolts attaching the cover. There is then no way of realigning the nut, for resecuring the cover.

The prior art contains several proposals for formations to be provided in structural items, to retain and correctly position in the structural item a securing means such as a screw threaded nut, to which other components of the structural item may be releasably secured.

U.S. Pat. No. 3,323,768 Hennessey shows a nut retaining formation for use in connecting together electronic components, the nut being releasably held in position in a slot between edge walls and flanges of the slot.

U.S. Pat. No. 595,139 Blakely shows a form of nut retaining formation for use in attaching a baby carriage chassis to the body.

U.S. Pat. No. 2,665,730 Trumble discloses a means for mounting a nut sheet metal, using a specially designed, flanged nut, to be retained by the edges of the sheet metal.

U.S. Pat. No. 3,178,749 Heepe shows a squeegee mop with attachment means comprising bolts extending through keyhole slots in a top plate.

U.S. Pat. No. 3,279,518 Bollinger discloses a bolt retaining key slot in which the head of a bolt is slid down a keyway, to be retained between an upper surface of an article and the bottom of a depressed tongue formed in the article.

Other various forms of nut and bolt securing formations in articles of manufacture can be found in U.S. Pat. No. 2,605,668 Hollopeter; Danish Pat. No. 23476; French Pat. No. 1,489,830 and British Pat. No. 1,283,168.

However none of the above items of prior art discloses a means for solving the problem outlined above. None of them shows an arrangement whereby access is provided for inserting and removing the securing means, e.g. the nut, from the same lateral surface as that from which the bolt is inserted. Thus, none of them shows an arrangement which could be used on a structure which is mounted or embedded in a blind aperture so that only one surface is accessible.

SUMMARY OF THE INVENTION

It is an object of the present invention to provide a novel means to retain a separable securing means in correct position in an article of manufacture, so as to permit another item to be releasably secured thereto.

It is a further object to provide novel securing means retaining formations in the body of a thermoplastic (metal or plastic) article of manufacture.

It is a further object to provide such novel securing formations which can be produced in the wall of the body by a simple, one step die stamping operation.

Other objects and advantages of the invention will become apparent from the following description.

According to the present invention, there is provided a thermoplastic article adapted to receive in the intermediate thickness of a wall thereof in predetermined position, an apertured securing means such as a screw threaded nut, the wall of said article having at least one laterally extending securing means receiving cavity in the intermediate thickness thereof;

and including, in the vicinity of said laterally extending cavity:

a bolt receiving aperture extending transversely from a first lateral wall surface into said laterally extending cavity to permit access of a bolt shank to said laterally extending cavity;

first securing means retaining formations disposed around said screw receiving aperture and extending transversely from said first lateral wall surface to define the first lateral boundary of said laterally extending cavity;

second securing means retaining formations disposed around said bolt receiving aperture and extending transversely from a second lateral wall surface to define the second lateral boundary of said laterally extending cavity;

said second securing means retaining formations being in transverse alignment with separations between said first securing means retaining formations;

at least one end of the laterally extending cavity communicating through the first lateral wall surface, to permit a securing means to be removably inserted into said cavity to lie in transverse alignment with said bolt receiving aperture;

said laterally extending cavity including means to prevent substantial angular movement of a securing means positioned therein.

A structure according to the present invention can readily be prepared in a thermoplastic article of manufacture such as a plastic or metal article, by a one step pressing or stamping operation using a suitable pair of co-operating dies. One of the dies can approach and stamp from the first side of the wall of the article, and the second can approach and stamp from the second side of the wall of the article, to stamp or press the required formations. By arranging for the dies to leave nut retaining formations in one thickness part of the wall which closely vertically align with spaces between nut retaining formations in the upper thickness part of the wall, i.e. dies which mate very closely with one another, and by pressing out the formations in the wall by arranging for these dies to overlap each other to a substantial but not a complete extent in the transverse direction, an internal, nut receiving cavity can be formed in a one step pressing operation.

The arrangement according to the invention allows a retaining nut to be introduced from one surface of the wall of the article, into correct registry with the bolt or screw receiving aperture to allow a screw entering the aperture to threadably engage the nut for securing purposes. The nut is retained in this position in the cavity provided interiorly of the thickness of the wall of the article. After disengagement of the screw, the nut remains so positioned. If desired, it can be slid out of the cavity and removed from the article, and replaced if necessary.

The means preventing angular movement of the securing means within the cavity is suitably side and/or end walls of the cavity itself, e.g. the end wall remote from the end which communicates through the lateral wall surface. Alternatively, however, the cavity can be provided with a shallow depression shaped complementarily to the securing means, so that the securing means rests in the depression and does not turn therein. Such an arrangement is especially suitable where more than one end of the laterally extending cavity communicates through the lateral wall surface.

For better understanding and appreciation of the invention, one embodiment thereof is described below in detail in conjunction with the accompanying drawings. This specific embodiment shows the invention as applied to a floor drain fitting, but it will be appreciated that this is merely one, illustrative use of the invention, and not limitative.

REFERENCE TO THE DRAWINGS

In the drawings, like reference numerals indicate like parts.

DESCRIPTION OF THE SPECIFIC PREFERRED EMBODIMENT

Figure 1:
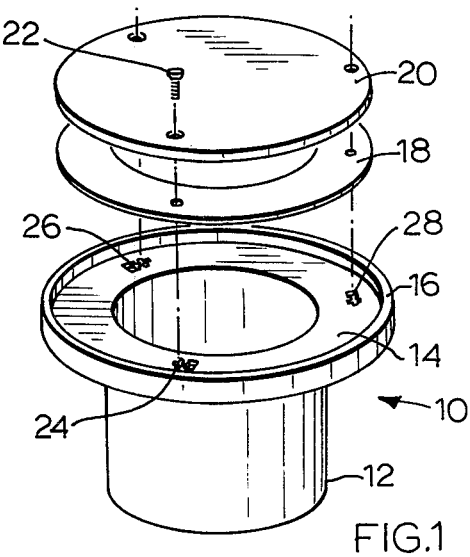
FIG. 1 shows in exploded perspective a flanged floor drain provided with nut retaining formations according to the invention, and a gasket and cover for the floor drain.

With reference to FIG. 1, there is illustrated a floor drain 10 of synthetic plastic material, of generally conventional form, having a cylindrical lower body part 12, and an upper outwardly extending peripheral flange 14 having an upstanding outer lip 16. In use, the floor drain 10 will normally be embedded in concrete, poured up to the level of the top of the lip 16 on the flange 14. The floor drain is then releasably assembled with a sealing ring 18 and a cover 20. The ring 18 and cover 20 are releasably assembled with the flange 14 of the floor drain by means of screws such as 22, passing through respective aligned apertures in the ring 18 and cover 20, and into respective aperture arrangements 24, 26, 28 in the flange 14, where they threadably engage nuts positioned therein. The aperture arrangements such as 24, and process and apparatus for their manufacture, are described in detail with reference to FIGS. 2-6.

Figure 3:
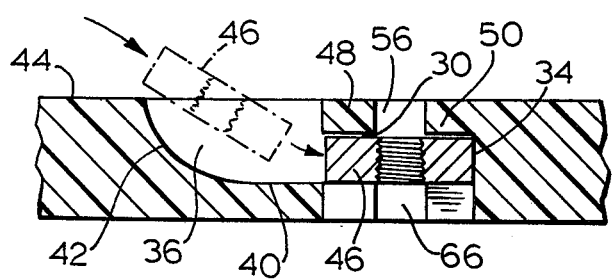
FIG. 3 is a section through the aperture arrangement as illustrated in FIG. 2, generally along the line 3—3 of FIG. 2.
Figure 2:
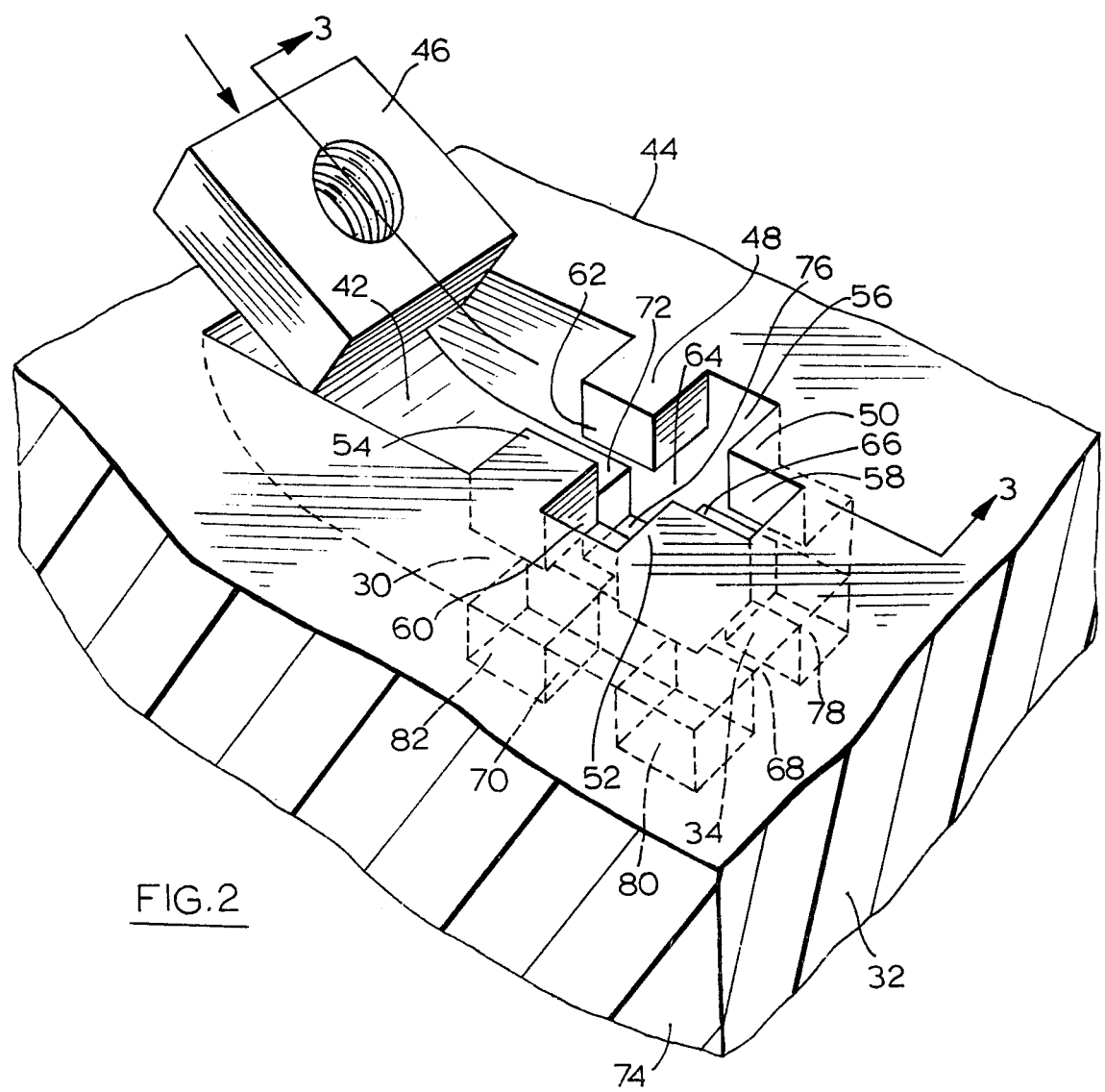
FIG. 2 is a perspective view of a detail of the article of FIG. 1, showing the aperture arrangements according to the invention.

With reference to FIGS. 2 and 3, the aperture arrangement of the invention comprises a nut receiving cavity 30 provided in the intermediate portion of the thickness of the wall 32 of flange 14 and extending laterally therein. At one lateral end, the cavity 30 terminates in a generally straight, vertically extending end wall 34. At the other lateral end, the cavity 30 communicates with a recess 36. The recess 36 has a bottom surface forming a smooth continuation of the bottom surface of cavity 30, the bottom surface of the recess having a generally flat portion 40 adjacent cavity 30, and a smooth upwardly sloping portion 42 remote therefrom, curving upwardly to the top surface 44 of wall 32. The recess 36 is thus open to the top surface 44 of the wall 32, the opening thereto being large enough to accomodate a screw threaded nut 46, and the sloping portion 42 of the bottom wall of the recess constituting a runway for slidable introduction of the nut 46 into the cavity 30.

As noted, the nut receiving cavity 30 is provided in the intermediate portion of the thickness of wall 32 of flange 14. It is bounded at its upper surface by a series of first nut retaining formations 48, 50, 52, 54 which are integral with the wall 32, and are generally square or rectangular as viewed in plan. These formations extend from the top surface 44 of the wall 32, a depth of about ⅓ the total thickness of the wall 32, the bottom surfaces of these formations thus forming the upper boundary of the cavity 30. Rectangular separations or spaces 56, 58, 60, 62 are left between the first formations 48, 50, 52, 54, so that as viewed in plan the combined spaces form a cruciform aperture extending from the top surface 44 of the wall 32 into the cavity 30. The centre 64 of the cruciform constitutes a screw receiving aperture through which a screw may project into the cavity 30.

Figure 4:
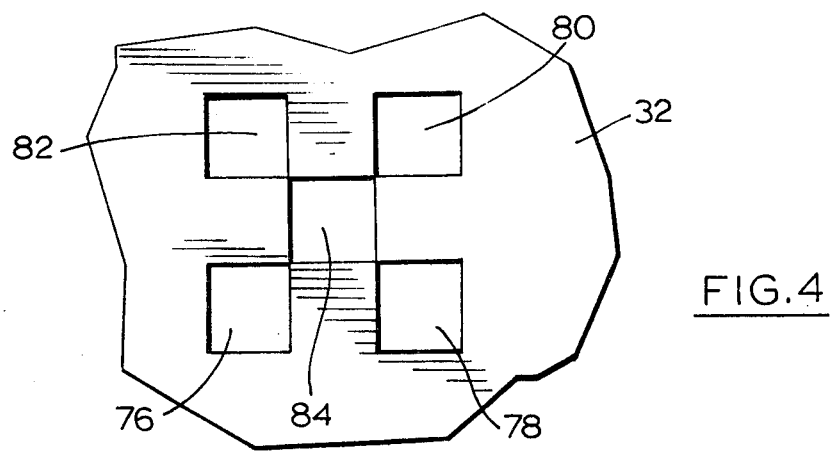
FIG. 4 is an underneath plan view of a portion of the flange of the floor drain of FIG. 1, showing the bottom apertures and formations therein.

In similar but substantially reversed manner, and as shown particularly in FIG. 4, the nut receiving cavity 30 is bounded at its lower surface by a series of generally rectangular nut retaining formations 66, 68, 70, 72. These formations are effectively residual material left in the bottom, approximate ⅓ thickness of the wall 32, from the bottom surface 74 thereof to the bottom of the cavity 30, after stamping out, in a generally square pattern from this bottom ⅓ thickness, four generally rectangular holes, 76, 78, 80, 82. These holes are arranged around a fifth rectangular hole 84 stamped in the centre of the square arrangement. The holes 76, 78, 80, 82 between the second, lower nut retaining formations 66, 68, 70, 72 align vertically with and are substantially the same size as the first nut retaining formations 48, 50, 52, 54 in the top portion of wall 32. The spaces 56, 58, 60, 62 between these first, upper nut retaining formations align vertically with and are substantially the same size as the second, lower nut retaining formations 66, 68, 70, 72 respectively. The centre 64 of the cruciform aperture in the top portion of wall 32 aligns vertically with the fifth, central hole 84 in the bottom portion of wall 32, to provide a screw receiving aperture extending through the entire thickness of the wall 32.

Thus a nut receiving cavity 30 is provided in the intermediate thickness of the wall 32. A nut 46 can be slid into this cavity, into a position wherein its screw threaded aperture 86 is located below centre 64 of the upper cruciform aperture, to be engaged by screw 22 for securing the drain cover 20 in position. The nut 46 enters down runway 42 from the top surface of the wall 32. It is a close fit with side walls and end wall 34 of the cavity to prevent rotation therein. The nut is held supported in slot 30 by resting on lower nut retaining formation 66, 68, 70, 72. The set of first, upper nut retaining formations 48, 50, 52, 54 prevent upward withdrawal of the nut from the cavity 30, and provide formations against which nut 46 can be tightened. When freed from screw 22, nut 46 can be withdrawn from cavity 30 up runway 42, and replaced and repositioned when required.

Figure 5:
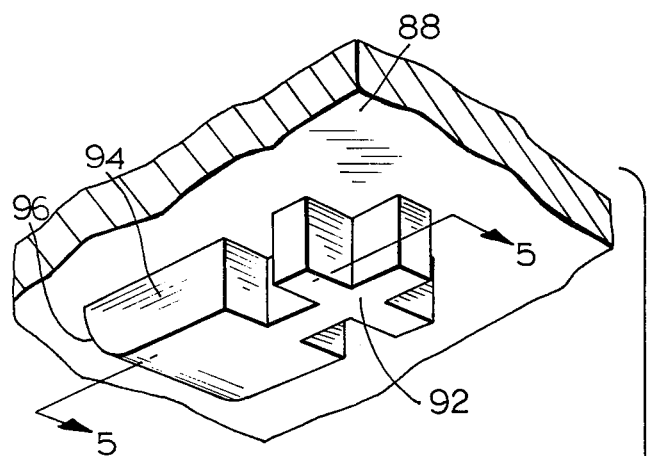
FIG. 5 shows in perspective a pair of co-operating dies useful for making aperture arrangements according to FIGS. 2, 3 and 4.
Figure 5:
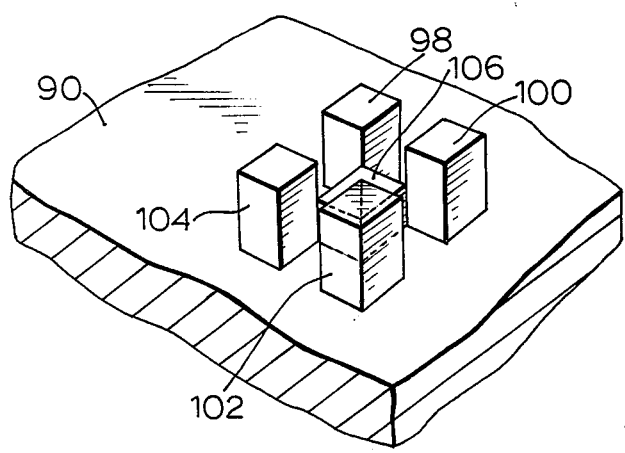
Figure 6:
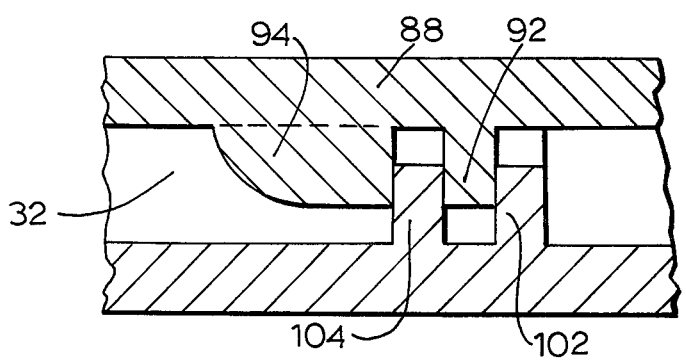
FIG. 6 is a section through the pair of dies of FIG. 5, showing them in co-operation in making aperture arrangements according to the invention, generally along the line 5—5 of FIG. 5.

Despite the fact that nut retaining cavity 30 is provided to a substantial extent internally of the thickness of wall 32, the arrangement of nut retaining formations according to the invention enables it to be formed readily and simply by die stamping. No expensive drilling or machining of the article is necessary. The means of forming the arrangement according to the invention is shown in FIGS. 5 and 6. It comprises an upper die plate 88 and a mating lower die plate 90.

The upper die plate 88 has a downwardly projecting forming die, one lateral end 92 of which is of cruciform shape, with generally square or rectangular section arms, and the other lateral end of which is in the form of a solid rectangular block 94 with a curved end wall 96 remote from the cruciform lateral end. The forming die presents a continuous lower surface.

The lower die plate is provided with four upstanding square or rectangular section forming dies 98, 100, 102, 104 arranged in a square configuration, and a fifth forming die 106 located in the centre of the other four. The forming die of the upper plate 88 has the same depth from the plate as the height of the forming dies 98, 100, 102, 104 from the bottom plate, with the centre, fifth forming die 106 having a height about ½ the height of the other forming dies. The cruciform die 92, 94, and the square configuration dies 98, 100, 102, 104 have heights equivalent to about ⅔ the wall thickness of the wall 32. Centre die 106 has its corners abutting the corners of the square configuration dies 98, 100, 102, 104.

As will be apparent from the foregoing description and accompanying drawings, the upper and lower dies 88, 90 are arranged to mate with one another, with the forming dies closely mating. With the thermoplastic wall 32 in heat softened condition between them, the dies 88, 90 are closed in mating fashion until the top surface of fifth, centre forming die 106 of bottom die plate 90 engages the centre of the bottom surface of cruciform die 92 on the top die plate 88. This is the position shown in section in FIG. 6. At this point, cruciform die 92 overlaps rectangular section dies 98, 100, 102, 104 to an extent of about half their depth. Because of the close mating fit of these dies with one another, a continuous, laterally extending, interior nut receiving cavity is thereby formed by the overlap, of a height corresponding to the extent of overlap. At the same time the engagement of fifth die 106 with the centre of cruciform die 92 ensures that a screw receiving aperture 64 extending through the entire wall thickness is formed. Rectangular block 94 of upper die plate 88 simultaneously presses and stamps out the runway recess 42. The respective gaps between the formations on the dies leave behind the respective nut retaining formations previously described.

In this manner, nut retaining formations according to the invention are pressed in thermoplastic articles by a simple, cheap, one step operation.

It will be appreciated that the specific embodiment described above is exemplary only, and is not to be construed as limiting. The invention is applicable to a wide variety of different articles made of thermoplastic material, synthetic thermoplastic resins or metals, in substantially any system where securing into a blind aperture in the article is necessary, in a releasable fashion, and where it is undesirable to machine in screw threads or similar means into the body of the article itself. The term "thermoplastic" used herein embraces both synthetic resin materials and metals. It will further be appreciated that the precise shape of the various nut retaining formations described herein is not critical. Square and rectangular formations illustrated herein are exemplary only, and may be the most convenient from a point of view of suitable designing of die stamping pieces. However, other arrangements of closely mating, co-operating dies for making nut retaining formations embodying the principles of this invention will be readily apparent to those skilled in the art.

The scope of the present invention is limited only by the scope of the appended claims.

What I claim is:

1. A thermoplastic article adapted to receive in the intermediate thickness of a wall thereof, in predetermined position, an apertured securing means, the wall of said article having at least one laterally extending securing means receiving cavity in the intermediate thickness thereof;

and including, in the vicinity of the laterally extending cavity:

a bolt receiving aperture extending transversely from a first lateral wall surface into said laterally extending cavity to permit access of a bolt shank to said laterally extending cavity;

first securing means retaining formations disposed around said bolt receiving aperture and extending transversely from said first lateral wall surface to define the first lateral boundary of said laterally extending cavity;

second securing means retaining formations disposed around said bolt receiving aperture and extending transversely from a second lateral wall surface to define the second lateral boundary of said laterally extending cavity;

said second securing means retaining formations being in transverse alignment with separations between said first securing means retaining formations;

at least one end of the laterally extending cavity communicating through the first lateral wall surface, to permit a securing means to be removably inserted into said cavity to lie in transverse alignment with said bolt receiving aperture;

said laterally extending cavity including means to prevent substantial angular movement of a securing means positioned therein.

2. The article of claim 1 wherein the securing means receiving cavity has one lateral end communicating through the first lateral wall surface, and an opposed lateral end comprised of an end wall adapted to engage a securing means in the securing means receiving cavity and thereby position the securing means in correct registry with said bolt receiving aperture.

3. The article of claim 2 wherein said one lateral end of the securing means receiving cavity communicates with a runway formation sloping gradually from the second transverse boundary of said laterally extending cavity to the first lateral wall surface.

4. The article of claim 3 wherein the bolt receiving aperture extends transversely through the entire thickness of the wall.

5. The article of claim 4 including a body portion and an integral laterally extending flange, said wall thereof containing the securing means receiving cavity therein being said laterally extending flange.

6. The article of claim 5 comprising a floor drain having a generally cylindrical body and an outer peripheral flange extending transversely to the axis of the body, said securing means receiving cavity extending laterally in the thickness of the flange, and having one lateral end communicating via a said runway formation with an opening in the top surface of the flange, to permit slidable entry of a securing means therein.

* * * * *